United States Patent [19]

Apicella et al.

[11] 3,804,686

[45] Apr. 16, 1974

[54] PROCESS FOR MAKING TUNNEL STRUCTURE FOR PLATED WIRE

[75] Inventors: Anthony M. Apicella, Massillon; William S. Tuma, Cuyahoga Falls, both of Ohio

[73] Assignee: Goodyear Aerospace Corporation, Akron, Ohio

[22] Filed: Apr. 6, 1972

[21] Appl. No.: 241,628

[52] U.S. Cl. .................. 156/155, 96/35.1, 156/272, 156/293, 156/305

[51] Int. Cl. ...................... B32b 31/28, B32b 31/10

[58] Field of Search ............ 96/35.1, 38.2; 156/109, 156/155, 182, 272, 292, 293, 300, 305; 161/139, 142, 143, 145, 161

[56] References Cited

UNITED STATES PATENTS

| | | | |
|---|---|---|---|
| 3,674,486 | 7/1972 | Milgrom | 96/35.1 |
| 3,696,072 | 10/1972 | Reynolds et al. | 96/35.1 |
| 3,664,899 | 5/1972 | Wright et al. | 96/35.1 |
| 2,396,438 | 3/1946 | Schaffer et al | 161/139 |

*Primary Examiner*—Daniel J. Fritsch
*Attorney, Agent, or Firm*—Oldham & Oldham

[57] ABSTRACT

The invention provides a tunnel structure for plated wire which permits precise alignment for plated wire and terminations so that automated bonding of the plated wire may be accomplished, and which will eliminate the use of forming wires during fabrication and hence reduce the scrap rate drastically, and which permits more rapid fabrication of tunnel structures.

3 Claims, 5 Drawing Figures

PROCESS FOR MAKING TUNNEL STRUCTURE FOR PLATED WIRE

Heretofore, it has been known that one of the difficulties in forming plated wire memories is manufacture of the tunnel structure to receive the plated wires and actually positioning the plated wires inside the tunnel structure. These problems heretofore have led to slow fabrication, high damage to the plated wires, and thus extremely high plated wire memory expense. Further, with the techniques known heretofore, the reliability of the plated wire memories made in the conventional way has been quite low because of the damage occurring to the plated wires being positioned in the tunnel structures.

The basic object of the instant invention is to improve upon and avoid the problems inherent in the prior structures by producing a tunnel structure for plated wire which permits precise alignment of the plated wire and termination so that automated bonding of the plated wire may be accomplished.

A further object of the invention is to provide a tunnel structure for plated wire which will eliminate the use of forming wires during fabrication and hence reduce the scrap rate of the tunnel structures and the plated wires accordingly.

A further object of the invention is to produce a tunnel structure for plated wire which will permit rapid fabrication of tunnel structures with high degrees of accuracy and low scrap rates.

For a better understanding of the method and ultimate structure of the invention, reference should be made to the accompanying drawings wherein.

Figure 1:
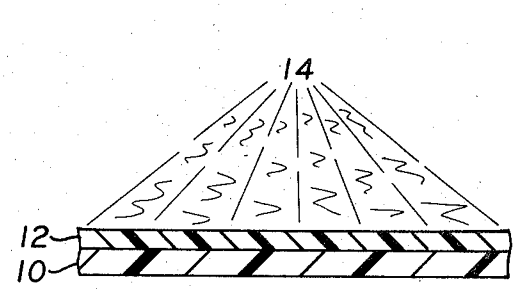
FIG. 1 is a cross-sectional exploded view of the first step in the process for forming the tunnel structure.
Figure 2:
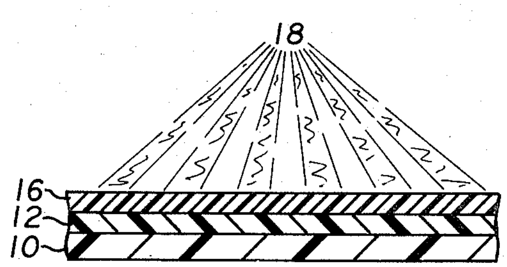
FIG. 2 is a cross-sectional exploded view similar to FIG. 1, except showing a layer of photolithic film positioned with respect thereto, and illustrating Step 2 of the process.
Figure 3:
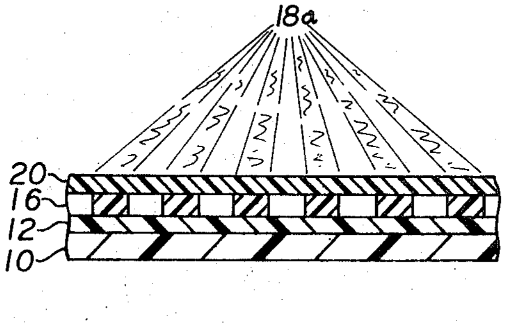
FIG. 3 is an exploded cross-sectional view similar to FIGS. 1 and 2 illustrating Step 3 of the process.
Figure 4:
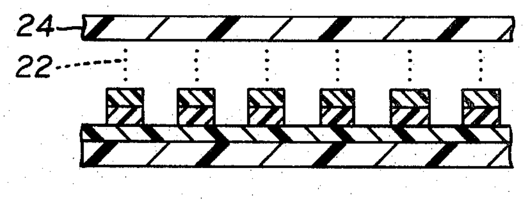
Figure 5:
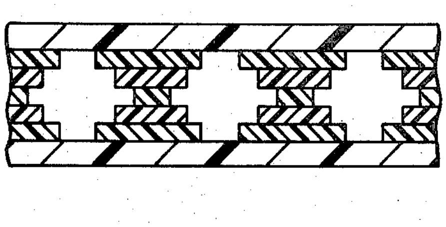

FIG. 4 is an exploded cross-sectional view similar to FIGS. 1 through 3 and illustrating Steps 4 through n of the process; and FIG. 5 is an exploded cross-sectional illustration of the final improved tunnel configuration achieved by following the Steps 1 through 4 illustrated in FIGS. 1 through 4.

The process basically consists of utilizing photographic techniques to produce a tunnel structure with photolyzable materials such as Riston, as made by E. I. DuPont de Nemours Co., Inc., or DynaChem, as made by DynaChem Corporation, or similar products. As is well known in the art, such materials are commonly referred to as photolyzable polymers or photoresist materials which, though normally soluable in a characteristic solvent, become insoluable and impervious to the effects of the solvent after being exposed to an ultraviolet or other short wavelength light source.

With reference to the drawings, and particularly Step 1 of FIG. 1, the numeral 10 indicates a substrate layer, which preferably would be some type of plastic or epoxy-based material, and numeral 12 indicates a layer of photolithic film. The photolithic film layer 12 is fully exposed as indicated at 14, and subsequently developed to produce a permanent layer between 0.001 inch to 0.0013 inch on the substrate 10.

Next, as indicated in Step 2 of FIG. 2, a second layer of photolithic film indicated by 16 is positioned on layer 12 and exposed by the particular line pattern indicated by 18 so that a pattern of ridges is exposed on a film layer 16. Such exposure is readily achieved by passing short wavelength light through a photonegative or other type mask onto the film layer 16. Such exposure techniques are commonly used in the fabrication of printed circuit boards. The invention contemplates that the exposed areas will be on approximately 0.015 inch centers, and have an exposed width of slightly greater than the diameter of the plated wires. Layer 16 may be similar in thickness to layer 12 or preferably may be considerably thicker. When the layer 16 is then developed, ridges are produced on layer 12 of the thickness thereof. As is well known in the art, development of the layer 16 is accomplished by subjecting the layer to a suitable solvent which dissolves and thus removes the unexposed portions thereof while leaving the exposed portions intact.

Step 3 then involves the adding of a second photolithic film layer 20, exposing it with the same pattern indicated by numeral 18*a*, and subsequently developing this to in effect build or double the height of the ridges produced between layers 16 and 20, all as is clearly shown in FIG. 3.

FIG. 4 illustrates that any further number of layers can be added at the point indicated by dotted line 22 to produce ridges of the desired height with reference to the layer 12. Normally the desired ridge height is the diameter of the plated wire. When the ridges of the desired height have been completed, a cover layer or resist layer 24 becomes the final component in the laminate, but this layer is not added until the plated wires have been positioned in the longitudinal grooves defined between the ridges.

It should be understood with respect to FIGS. 1 through 4 that the lateral and vertical dimensions of the exploded views are not necessarily to scale, but merely illustrate the relationships involved. In other words, if these drawings were to scale between the vertical and horizontal dimensions, there would be a much greater spreading out in the horizontal direction. Hence, with a ridge width of between 0.005 inch to 0.010 inch, the number of additional layers of photolithic film added should be sufficient to develop a substantially square hole in which a circular cross-sectioned printed circuit wire of approximately 0.005 inch diameter could be inserted.

FIG. 5 illustrates a modified embodiment of the invention where the various exposed intermediate film layers are exposed to variable widths to actually in effect produce a contoured or curved configuration to the tunnel formed by the ridges. In this way, even a substantially circular contour could be produced. Again, because of the disproportionate relationship between the vertical distances and the horizontal distances, the circular relationship is not illustrated, but it would occur by varying the width of the successive exposed layers. This type of configuration would even more accurately allow the plated wires to be readily positioned without damage or scratching of their exterior surfaces. In all the exposure techniques defined herein the registration is maintained by using the same artwork as negatives, using good contact printing techniques and using some registration holes such as the ALDUS type.

The advantages of the techniques shown in FIGS. 1 through 5 used in the fabrication of this system are as follows:

1. No forming wires are used in the fabrication.
2. Since the tunnel structure is made photographically, it will line up precisely with the artwork for wire terminations and automatic bonding technqiues are thereby possible.
3. The process is more suitable for mass production.

The number of intermediate layers to build the ridges to the desired height is completely arbitrary, and will depend upon the thickness of the layers and the particular photolyzable material utilized. It should be understood also that the ridges will run the full length of the substrate and the full desired length of the plated wires which will be inserted into the tunnels formed by this photographic technique.

While, in accordance with the Patent Statutes only the best known embodiment of the invention has been illustrated and described in detail, it is to be clearly understood that the invention is not limited thereto or thereby, but that the inventive scope is defined in the appended claims.

We claim:

1. The method for forming an improved tunnel structure which comprises the following steps:

a. Forming a photolithic compatible layer onto a suitable substrate, and fully exposing and developing the compatible layer to present a permanent receptive surface on the substrate;
b. Laying a photolithic film onto the receptive surface, exposing the film with a parallel lined pattern, and developing the film with a solvent to define a plurality of parallel ridges;
c. Laying plated wire into the grooves between the ridges; and
d. Attaching a cover layer over the ridges to form a laminate where the plated wires are positioned through the holes defined between adjacent ridges.

2. A process according to claim 1 which includes adding at least a second layer of photolithic film after the first layer has been exposed and developed, exposing the second and all subsequent layers with the same pattern as the first layer, and developing each subsequent layer with a solvent to form ridges of selected height with respect to the base layer, whereby the grooves defined between the ridges are of substantially the same width and height as the diameter of the plated wire inserted therein.

3. The process according to claim 2, wherein the width of the ridges exposed on the second and subsequent layers is varied to develop a ridge with contoured side surfaces to better cooperate with the circular cross-sectional configuration of the plated wires.

* * * * *